United States Patent
Grozinger et al.

(10) Patent No.: US 8,197,135 B2
(45) Date of Patent: Jun. 12, 2012

(54) SENSOR SYSTEM FOR DETERMINING A PHYSICAL, MEASURED VARIABLE

(75) Inventors: Roland Grozinger, Staufen (DE); Klaus Ruf, Rheinfelden (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 778 days.

(21) Appl. No.: 12/086,781

(22) PCT Filed: Nov. 24, 2006

(86) PCT No.: PCT/EP2006/068907
§ 371 (c)(1),
(2), (4) Date: Nov. 26, 2008

(87) PCT Pub. No.: WO2007/074005
PCT Pub. Date: Jul. 5, 2007

(65) Prior Publication Data
US 2009/0201972 A1    Aug. 13, 2009

(30) Foreign Application Priority Data

Dec. 23, 2005  (DE) .......................... 10 2005 062 389

(51) Int. Cl.
G01K 11/00    (2006.01)
G01K 7/00    (2006.01)
(52) U.S. Cl. .................. 374/183; 374/178; 374/117
(58) Field of Classification Search .................. 374/183, 374/185, 178, 117
See application file for complete search history.

(56) References Cited

U.S. PATENT DOCUMENTS

| | | | |
|---|---|---|---|
| 3,834,233 A * | 9/1974 | Willis et al. ................. | 73/290 V |
| 4,229,798 A * | 10/1980 | Rosie et al. ................. | 702/54 |
| 4,401,949 A | 8/1983 | Gold | |
| 4,737,657 A * | 4/1988 | Jatko et al. ................. | 307/85 |
| 4,984,449 A * | 1/1991 | Caldwell et al. ............. | 73/49.2 |
| 5,162,725 A | 11/1992 | Hodson | |
| 5,226,320 A * | 7/1993 | Dages et al. ................ | 73/290 V |
| 5,377,128 A * | 12/1994 | McBean ....................... | 702/91 |
| 5,857,777 A * | 1/1999 | Schuh ......................... | 374/172 |
| 6,397,656 B1 * | 6/2002 | Yamaguchi et al. .......... | 73/1.82 |
| 2005/0092081 A1 * | 5/2005 | Spanke et al. ............... | 73/290 V |

FOREIGN PATENT DOCUMENTS

| | | |
|---|---|---|
| DE | 198 06 569 | 10/1998 |
| DE | 103 23 063 | 12/2004 |
| EP | 0 340 953 | 11/1989 |

OTHER PUBLICATIONS

Maxim, CMOS Micropower Inverting Switching Regulator (May 1986).*

* cited by examiner

*Primary Examiner* — Lisa Caputo
*Assistant Examiner* — Mirellys Jagan
(74) *Attorney, Agent, or Firm* — Bacon & Thomas, PLLC

(57) ABSTRACT

A sensor system for determining a physical, measured variable, and includes a sensor and a control/evaluation unit, which are spatially separated from one another and electrically conductively connected via a cable having at least two conductors, wherein provided in the sensor are a temperature measuring element for determining temperature and a sensor identifier for sensor identification. The control/evaluation unit drives the temperature measuring element and the sensor identifier via a shared conductor with a positive voltage or a negative voltage, and, depending on the applied voltage, reads a temperature measured value of the temperature element or an identifying value of the sensor identifier.

9 Claims, 1 Drawing Sheet

SENSOR SYSTEM FOR DETERMINING A PHYSICAL, MEASURED VARIABLE

TECHNICAL FIELD

The invention relates to a sensor system for determining a physical, measured value and includes a sensor and a control/evaluation unit, which are spatially separated from one another and electrically connected via a cable having at least two conductors, wherein provided in the sensor are a temperature measuring element for determining temperature and a sensor identifier for sensor identification.

BACKGROUND DISCUSSION

Such sensor systems for determining a physical, measured variable, especially fill-level in a container, are used frequently in measuring devices of automation and process-control technology. The assignee, for instance, produces and distributes measuring devices under the name, Prosonic, FMU. These work according to the travel-time measurement method and serve for determining and/or monitoring fill-level of a fill substance in a container. In the travel-time measuring method, for example, ultrasonic sound signals produced via an ultrasonic transceiver are transmitted into the process space, and the reflected echo waves are, following a distance-dependent travel time of the signals, received back by a transmitting/receiving element. From the time difference between transmission of the ultra-/sonic signals and receipt of the reflected echo signals, separation of the measuring device from the fill-substance can be ascertained. Apparatuses and methods for determining fill-level via travel-time of ultrasonic signals, or other signals, such as e.g. radar, utilize a physical law, according to which the traveled distance is equal to the product of travel time and velocity of propagation. Taking into consideration geometry of objects installed in the container and the container itself, the fill level of the fill substance is then ascertained as a relative, or absolute, quantity.

Production of sound waves, e.g. ultrasonic waves, and the detecting of the reflected echo waves following a distance-dependent travel time can be done separately by separate transmitting and receiving elements or by combined transmitting/receiving elements. In practice, most often, only a single transmitting/receiving element—a so-called ultrasonic transceiver—is used, which produces a transmission signal and receives, displaced in time, a reflected, or echo, signal.

Travel time of ultrasonic waves depends on propagation velocity of the ultrasonic waves in the gas phase above the medium to be measured and is generally referred to as the gas-phase velocity. This gas-phase velocity is, among other things, strongly dependent on the temperature of the gas phase, in which the ultrasonic wave is propagating. For this reason, temperature of the medium must be known for determining gas-phase velocity, in order that the travel time of the ultrasonic signals can be converted to a corresponding traveled distance.

Additionally, an ultrasonic sensor is excited in such a manner that it oscillates at the resonance frequency. In this resonance-frequency mode of the ultrasonic sensor, a highest possible transmitted power of the ultrasonic signal is achieved. The resonance frequency of the ultrasonic sensor depends both on the geometric variables of the sensor and its sensor element, as well as also on surrounding temperature.

DE 103 23 063, DE 42 33 257 C1 and DE 42 23 346 C2 describe fill-level measuring devices with ultrasonic sensors, wherein the resonance frequency of the ultrasonic sensors is determined at different temperatures. Integrated into these ultrasonic sensors are temperature sensors serving for registering the current, surrounding temperature of the ultrasonic sensor. On the basis of the current, surrounding temperature, the resonance frequency of the ultrasonic sensors is tracked and matched by the measurement transmitter by adjusting the excitation during transmission operation. From current values and historical values of the resonance frequency and the surrounding temperature, also a statement can be made concerning deposition of medium on the ultrasonic sensor, i.e. concerning the matter of so-called accretion.

DE 198 08 994 C2 describes, in contrast, an apparatus, which, by means of a temperature compensation capacitor in the ultrasonic sensor, counteracts a deviation of the temperature-dependent resonance frequency of the ultrasonic transducer brought about by a change of the surrounding temperature.

In process plants, there are various measuring conditions, such as, for example, container geometries, range, measured-value resolution, measured medium, which can, most often, not be covered alone by a single ultrasonic sensor. In order that these different ultrasonic sensors can operate at their respective resonance frequencies, the measurement transmitter must drive them with appropriate exciting signals. For this, it is necessary to know the type of attached ultrasonic sensor. One possibility is to allow the type of connected ultrasonic sensor to be automatically ascertained by an integrated sensor identifier, for example in the form of an identifying resistance. Such an identifying resistance is integrated in DE 40 35 403 A1 in the sensor body. The identifying resistance is read by the control unit, or the measurement transmitter, in that a fixed connection is provided between sensor and control unit, and the type of sensor is then established.

For independent evaluation of the sensor identifier and the temperature-measuring element by the measurement transmitter, in usual devices, the measurement transmitter evaluates both separately from one another. This causes an increased effort as regards connecting and measuring between sensor and measurement transmitter.

SUMMARY OF THE INVENTION

An object of the invention is to provide a sensor unit for reducing connecting and measuring effort between sensor and measurement transmitter, as well for increasing accuracy of measurement.

This object is achieved according to the invention by a sensor system, in which the control/evaluation unit drives the temperature measuring element and the sensor identifier via a shared conductor with a positive voltage or a negative voltage, and, depending on applied voltage, reads a temperature measurement value of the temperature element or an identifying value of the sensor identifier.

In an embodiment of the sensor system, a temperature dependent resistance is provided in the temperature measuring element and/or an identifying resistance in the sensor identifier.

In a further embodiment of the sensor system, at least one electrical blocking element is provided in the temperature measuring element and/or in the sensor identifier.

An embodiment of the sensor system aiding achievement of the object includes the feature that, in series with the temperature-dependent resistance and/or in series with the identifying resistance, in each case, an electrical blocking element with opposed blocking means is provided.

In an advantageous form of embodiment of the sensor system, it is provided that the blocking element comprises a diode.

A very advantageous variant of the sensor system includes the feature that the blocking element comprises a field-effect transistor, or a unipolar transistor.

In an advantageous form of embodiment of the sensor system, it is provided that the field-effect transistor is so arranged with respect to the temperature-dependent resistance of the temperature measuring element or with respect to the identifying resistance of the sensor identifier that a voltage drop across the temperature-dependent resistance or across the identifying resistance switches the field-effect transistor.

In an advantageous form of embodiment of the sensor system, it is provided that a switching element is placed in the control/evaluation unit and, in turn, switches the positive voltage or the negative voltage and corresponding series resistances onto the shared conductor.

In an advantageous form of embodiment of the sensor system, the respectively applied positive or negative voltage forms, via the two conductors of the cable, a voltage divider with the corresponding series resistance and the sensor identifier or the temperature measuring element.

A supplementing, advantageous embodiment of the sensor system provides that the sensor is an ultrasonic sensor for ascertaining fill level in a container, wherein a piezoelectric transducer is provided as sensor element for ascertaining the physical variable.

Additionally, it is provided that a third conductor is present in the cable and serves for operating the sensor element by the control/evaluation unit (3).

Further features and advantages of the invention will become evident from the description which follows, wherein the construction and manner of functioning of two different forms of embodiment according to the invention are explained in detail on the basis of schematic drawings.

BRIEF DESCRIPTION OF THE DRAWINGS

For simplification in the drawings, identical parts are provided with the same reference characters. The figures of the drawings show as follows.

DETAILED DISCUSSION

Figure 1:
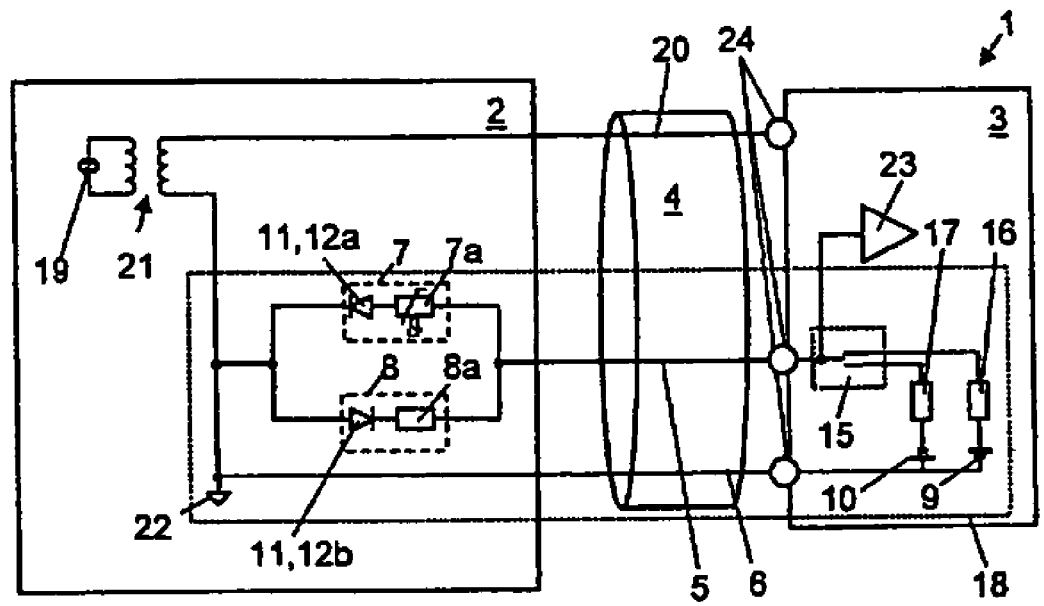
FIG. 1 is an example of a first embodiment of a sensor system for ascertaining fill level, with blocking elements in the form of diodes, which are arranged mutually opposed and serially, respectively, with the identifying resistance of the sensor identifier and with the temperature-dependent resistance of the temperature measuring element.

FIG. 1 shows a sensor system 1, whose sensor 2 is spatially removed from the control/evaluation unit 3 and electrically conductively connected therewith via a cable 4 containing conductors 5, 6, 20. The control/evaluation unit 3 is, in general, also referred to as a measurement transmitter 3. Cable 4 with the conductors 5, 6, 20, is connected releasably and electrically conductively to the control/evaluation unit 3 via a connection terminal 24. Sensor 2 is, for example, connected mechanically securely with the cable 4 and, moreover, electrically conductively with the conductors 5, 6, 20 pictured in the cable 4. The connecting distance between sensor 2 and measuring transmitter 3 via the cable 4 can amount to several meters in automation and process plants. Via a third conductor 20 in the cable 4 and the reference-ground conductor 6 as return conductor, in the case of an ultrasonic sensor, a transformer 21 is operated by the control/evaluation unit 3 with a voltage of about 55 volt. Transformer 21 increases the voltage. With the stepped-up voltage of about 400-800 volt, a piezoelectric transducer element, as sensor element 19, is excited to oscillate. This piezoelectric transducer element produces, with the surrounding structure, a composite oscillatory system, which oscillates with a certain resonance frequency.

Integrated in sensor 2 is a temperature measuring element 7 for ascertaining temperature □ and a sensor identifier 8 for determining connected sensor type. Temperature measuring element 7 and sensor identifier are in parallel branches of the shared conductor 5 and include, in each case, a blocking element 11. The two blocking elements 11 are mutually opposed, in that their forward-current directions are oppositely directed. In this first example of an embodiment, the temperature measuring element 7 is embodied as a temperature-dependent resistance 7a with a serially arranged, first diode 12 as blocking element 11, and the sensor identifier 8 as an identifying resistance 8a with a serially arranged, second diode 12b as blocking element 11. Via a shared conductor 5 and a reference-ground conductor 6 as return conductor, the measurement transmitter reads, depending on the applied voltage, the temperature measuring element 7 and/or the sensor identifier 8 alternately or according to a predetermined plan. Most often, however, the measurement transmitter 3 reads the sensor identifier 8 only during start-up of the sensor system 1, and the temperature □ is read via the temperature measuring element 7 continuously or alternatingly during the entire measuring phase of the sensor system 1. To accomplish the reading, a positive voltage 9 or a negative voltage 10 is switched via a switching element 15 integrated in the measurement transmitter 3 onto the shared conductor 5. Applicable as switching element 15 are, for example, two complementary, field-effect transistors (CMOS), whereby also a high-resistance state of the switching element 15 can be produced. In this way, the switch element 15 and the shared conductor 5 are in a potential-free state, when both field-effect transistors are not switched on and, consequently, are in the high-resistance state.

Evaluation of the temperature measured-value occurs, for example, by switching element 15 switching the positive voltage 9 with the first series resistance 16 onto the shared conductor 5. The first diode 12a as blocking element 11 of the temperature measuring element 7 is then presented with a positive applied voltage 9 in the forward-current direction, whereby, as a result of the electrical current flow through the temperature-dependent resistance 7a, a temperature-characterizing voltage drop is created. This voltage drop is ascertained via a voltage measuring section 23 from the connection terminal 24 on the basis of the voltage divider 18 formed by the first series resistance 16, the temperature-dependent resistance 7a and the first diode 12a. Since the second diode 12b is, in such case, biased in the reverse direction, no measurement current that could corrupt the measurement result of the temperature value flows in the branch of the sensor identifier 8. The resulting voltage ascertained by the voltage measuring section 23 depends only on the temperature-dependent resistance 8a and on the voltage drop across the first diode 12a under forward bias.

Correspondingly, evaluation of the identifying value of the sensor 2 can occur when the switching element 15 applies to the shared conductor 5 the negative voltage 10 with the second series resistance 17. The second diode 12b as blocking element 11 of the sensor identifier 8 is forward biased in the case of a negative applied voltage 10, whereby, as a result of the electrical current flow through the identifying resistance 8a, the voltage drops dependent on sensor type. This voltage drop is ascertained via the voltage measuring section 23 from the connection terminal 24 on the basis of the voltage divider 18 formed by the second series resistance 17, the identifying resistance 8a and the second diode 12b. The reference-ground conductor 6 serves in these cases as return line for the measuring current. Since the first diode 12a is reverse biased, there flows in this branch of the temperature measuring element 7 no measuring current, which would corrupt the measurement result of the identifying value. The resulting voltage ascertained by the voltage measuring section 23 depends only on the identifying resistance 8a and the forward-bias voltage drop of the second diode 12b.

The resulting voltages, as ascertained by the voltage measuring section 23, are proportional to the temperature value to be measured or to the identifying value of the particular sensor 2. The, for example, positive resulting voltage of the temperature value and the negative resulting voltage of the identifying value are evaluated further in the voltage measuring section 23 and a subsequent evaluation electronics (not shown explicitly here). By the different polarity of the two resulting voltages, a very great disturbance resistance is achieved in the ascertaining of the two values, such as, for example, a temperature value and an identifying value of a sensor 2. It is also possible to replace the resistance elements, such as the temperature-dependent resistance 7a and/or the identifying resistance 8a, just with diodes 12 of different forward-current characteristic curves, which also can show a strong temperature-dependence. This has the advantage that the resistance element is saved by a switching element.

The temperature dependence of the characteristic curves of diodes 12 in the forward-bias region has, on the other hand, the disadvantage that temperature □ cannot be determined exactly. The forward-bias characteristic curve of bipolar diodes varies strongly with temperature. From the formula for the ideal diode, taking into consideration temperature, the known Shockley equation is obtained, which describes the general relationship between the forward current and forward voltage of a diode. Bipolar elements exhibit, in general, a negative temperature characteristic, which opposes the measurement effect of temperature □ on the temperature-dependent resistance. Consequently, the two temperature effects at the temperature-dependent resistance 7a and at the diode partially cancel one another, or at least mutually affect one another. Since, in this first form of embodiment, the positive temperature characteristic of the temperature-dependent resistance 7a is affected by the negative temperature characteristic of the first diode 12 in a non-predictable way, an exact determining, above all, of the current temperature □ is only conditionally possible. Furthermore, from the voltage drop at the diodes, additional power, e.g. as heat, is converted in the sensor, which is then no longer available to the sensor system 1 fed, for example, with 4-20 mA current loop.

Figure 2:
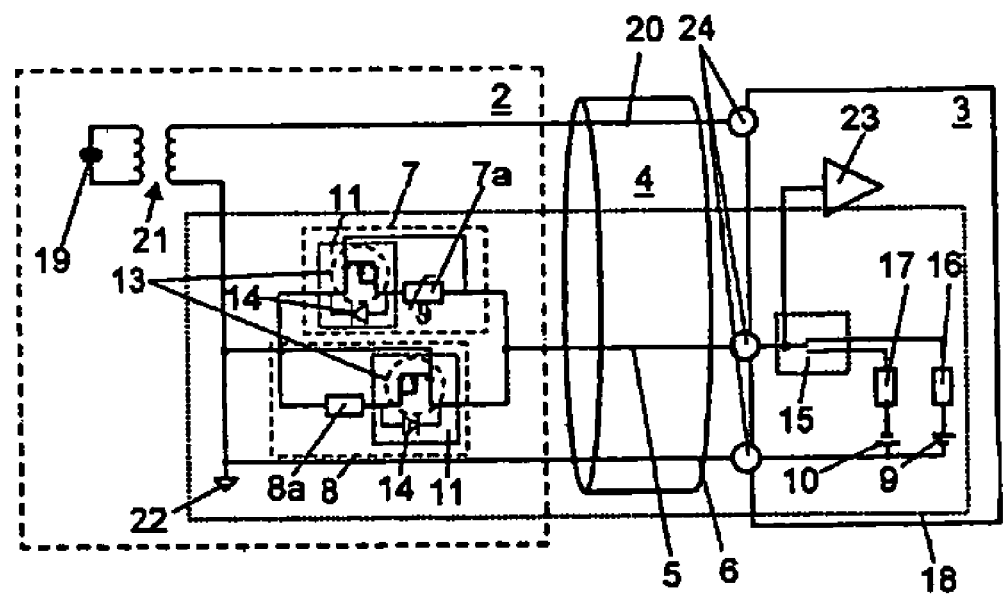
FIG. 2 is an example of a second embodiment of a sensor system for ascertaining fill level, with blocking elements in the form of field-effect transistors, which are arranged mutually opposed and serially, respectively, with the identifying resistance of the sensor identifier and with the temperature-dependent resistance of the temperature measuring element.

For decreasing the energy consumption of sensor system 1 and for avoiding the influence of the temperature-dependent characteristic curve of diodes 12 on the temperature value, or resulting voltage value, the diodes 12 are fundamentally replaced in a second example of an embodiment in FIG. 2 by field-effect transistors.

In the second example of an embodiment, two self-blocking, N-channel MOSFETs (metal-oxide-semiconductor field-effect transistors) are shown. Of course, as regards the invention, other types of field-effect transistors, or unipolar transistors, can be applied.

A decisive advantage of the field-effect transistor compared with the bipolar technology of bipolar transistors and diodes is that the switching of the source-drain path by application of a potential at the gate occurs purely capacitively, whereby the field-effect transistor can be operated almost without power, or current, loss. Compared with the bipolar technology, the conduction channel of MOSFETs has a purely resistive characteristic, which determines the static voltage drop and static power loss during operation. First because of this, the high efficiencies of power-electronic circuits become possible, especially in the case of low voltages and little available energy. In contrast with bipolar transistors with their negative temperature characteristic, the conduction channel of MOSFETs has a positive temperature characteristic. This makes it possible to connect a plurality of MOSFETs in parallel without additional measures for symmetry, in order to increase the current carrying ability and to decrease the voltage drop through the conduction channel.

The temperature measuring element 7 works in this second form of embodiment in the following manner. Upon application of a positive voltage 9, the parasitic diode 14, which is physically integrated in the field-effect transistor 13 for reasons relating to how the transistor is made, conducts a minimal current. This current flow is sufficient that the control electrode (gate) of the field-effect transistor 13 lies at a more positive potential than the supply electrode (source). The higher the applied voltage between source and gate, the lower-resistant is the switching path, the channel between the sink electrode (drain) and the supply electrode (source) of the field-effect transistor. The resulting channel resistance of the switched field-effect transistor 13 lies in the range of under one Ω (ohm), so that this has no effect on the temperature measurement with a temperature-dependent resistance in the kΩ (kiloOhm) range. The parasitic diode 14 is short-circuited via the on-switched conduction channel of the field-effect transistor 13 and thus has no effect on the resulting voltage. The field-effect transistor 13 integrated in the sensor identifier 8 in the parallel measurement branch of the shared conductor 5 also has no further influence on the resulting voltage, since the parasitic diode 14 in the field-effect transistor 13 of the sensor identifier is reverse biased and the gate lies at a more negative potential relative to the source. The resulting voltage tapped by the voltage measuring section 23 from the voltage divider 18 is only still influenced by the temperature-dependent resistance 7a and is, thus, proportional to such.

If, in contrast, a negative voltage 10 is applied via the switching element 15 to the shared conductor 5, the field-effect transistor 13 in the sensor identifier turns completely on. In such case, no current flows through the branch of the temperature measuring element 7, since this field-effect transistor 13 and its parasitic diode 14 completely block the current. The switching behavior of the field-effect transistor 13 in the sensor identifier 8 is the same as in the temperature measuring element 7, and such has already been explained in detail above. The identifying resistance 8a of the sensor identifier 8 lies in the range of above 20 kΩ (kiloOhm), so that the resistance of the channel of the field-effect transistor, which is smaller than one Ω (ohm) in the completely turned-on state, has no affect on the resulting voltage.

The invention claimed is:

1. A sensor system for determining a physical, measured variable, comprising:
   a sensor; and
   a control/evaluation unit, which are spatially separated from the sensor and electrically conductively connected with the sensor via a cable having at least two conductors, wherein:
   provided in said sensor are a temperature measuring element for determining temperature and a sensor identifier for sensor identification;
   said control/evaluation unit drives said temperature measuring element and said sensor identifier with a positive voltage or a negative voltage via a shared conductor of said at least two conductors and, depending on the applied voltage, reads a temperature measured value of said temperature element or an identifying value of said sensor identifier;
   a temperature-dependent resistance is provided in said temperature measuring element; and
   an identifying resistance is provided in said sensor identifier; and
   in series with said temperature-dependent resistance and/or in series with said identifying resistance, in each case, an electrical blocking element of opposed blocking direction is provided.

2. The sensor system as claimed in claim 1, wherein:
   said sensor is an ultrasonic sensor for ascertaining a fill level in a container, and a piezoelectric transducer is provided in said ultrasonic sensor as sensor element for ascertaining the physical variable.

3. Apparatus as claimed in claim 1, further comprising:
   a third conductor in the cable which serves for operating said sensor element by said control/evaluation unit.

4. The sensor system as claimed in claim 1, further comprising:
   a switching element in said control/evaluation unit for switching the positive voltage or the negative voltage and corresponding series resistances onto said shared conductor.

5. The sensor system as claimed in claim 4, wherein:
   the particularly applied positive voltage or negative voltage with the corresponding series resistance and said sensor identifier or said temperature measuring element form, via said two conductors of the cable, a voltage divider.

6. The sensor system as claimed in claim 1, further comprising:
   at least one electrical, blocking element in said temperature measuring element and/or in said sensor identifier.

7. The sensor system as claimed in claim 6, wherein:
   the blocking element comprises a diode.

8. The sensor system as claimed in claim 6, wherein:
   said blocking element comprises a field-effect transistor, or a unipolar transistor.

9. The sensor system as claimed in claim 8, wherein:
   said field-effect transistor is so arranged with respect to the temperature-dependent resistance of said temperature measuring element or with respect to the identifying resistance of said sensor identifier that a voltage drop at the temperature-dependent resistance or at the identifying resistance switches on said field-effect transistor.

* * * * *